United States Patent Office 3,531,460
Patented Sept. 29, 1970

3,531,460
ERYTHROMYCIN TETRACYCLINE CONTAINING ANTIBIOTIC DERIVATIVES
Rodolfo Ferrari, Giuseppe Ghielmetti, and Sergio Magnaghi, Milan, Italy, assignors to SPA-Societa Prodotti Antibiotici S.p.A., Milan, Italy
No Drawing. Filed Jan. 23, 1968, Ser. No. 699,783
Claims priority, application Great Britain, Jan. 25, 1967, 3,776/67
Int. Cl. C07c 47/18
U.S. Cl. 260—210
15 Claims

ABSTRACT OF THE DISCLOSURE

There are described new salts of antibiotics with phosphorylated hexoses and with non-toxic inorganic and organic acids. Of primary interest are the reaction products of a hexose mono- or di-phosphate with a known tetracycline antibiotic and with both erythromycin and a known tetracycline antibiotic, also said latter mixed antibiotic product further reacted with pyrrolidine and formaldehyde, and non-hexose products such as phosphoric, sulfuric or citric acid salts of both erythromycin and a known tetracycline antibiotic and, finally, said phosphoric or sulfuric or citric acid salt further reacted with pyrrolidine and formaldehyde. The new compounds have the pharmaceutical utilities associated with the known antibiotics per se.

BACKGROUND OF THE INVENTION

Several well-known and useful antibiotics suffer from the disadvantage of having a low solubility. It is also known that mixtures of two or more bactericidal antibiotics or of two or more bacteriostatic antibiotics frequently exhibit synergism and are, therefore, very useful therapeutically. Unfortunately, however, it is frequently not possible to prepare mixtures of bactericidal and bacteriostatic antibiotics since the components of such mixtures often exhibit antagonism. Another disadvantage of known mixtures of antibiotics is that the components of the mixtures often have different solubilities, which prevents a synchronous absorption of the components.

Consequently, there is clearly a great need for new and soluble derivatives of antibiotics and for associations of two or more antibiotics which overcome the above mentioned antagonism and which also exhibit synergism since it is obvious that associations between two or more antibiotics will increase the spectrum of activity, improve the efficacy in the case of mono-bacterial infections, decrease the possibility of toxic side effects of the components of the association, reduce the formation of bacterial resistance to the components of the association and minimise the reduction of the risk of bacterial superinfections.

SUMMARY OF THE INVENTION

We have now found, according to the present invention, that the effectiveness of antibiotics can be improved by the formation of the corresponding salts with phosphorylated hexoses, such as glucose-1-phosphoric acid, glucose-6-phosphoric acid and fructose-1,6-diphosphoric acid, and that valuable mixed salts of antibiotics can be formed with the use not only of the said phosphorylated hexoses but also with the use of non-toxic, polybasic inorganic and organic acids, such as sulphuric acid, phosphoric acid, citric acid and succinic acid.

Some of the new salts according to the present invention have a comparatively low solubility in water but this difficulty can readily be overcome by amino-methylating the new salts by the Mannich reaction to give water-soluble derivatives which are almost neutral and are outstandingly useful for administration by injection. The Mannich reaction is carried out in known manner by using formaldehyde and a compound of the general formula R.NH.R', wherein R and R', which may be the same or different, are hydrogen atoms or aliphatic or cycloaliphatic radicals and wherein R and R' are joined together directly or via a hetero atom, such as a nitrogen, oxygen or sulphur atom.

DETAILED DESCRIPTION OF THE INVENTION

The mixed salts according to the present invention are especially valuable since they enable very high and synchronous blood levels of two or more different antibiotics to be obtained. Furthermore, when the salts are formed with the use of a phosphorylated hexose, there is the additional advantage that the residue of the phosphorylated hexose also exerts a therapeutic effect because phosphorylated hexoses are themselves essential metabolites with antitoxic, anti-glycodepletive, myocardiotrophic and antiastenic activities, which properties are especially useful in the course of antibiotic therapy.

In the case of new salts according to the present invention which are still acidic, these can, if desired, be neutralised with therapeutically inactive inorganic or organic bases or with the same or another antibiotic.

As examples of antibiotics which can be used to prepare the new salts according to the present invention, there may be mentioned erythromycin, tetracycline, pyrrolidinomethyl-tetracycline, chlortetracycline, pyrrolidinomethyl - chlortetracycline, demethylchlortetracycline and oxytetracycline.

In order to prepare the new salts of the present invention, the antibiotic or antibiotics in question is or are dissolved in a suitable solvent, such as a lower aliphatic alcohol, for example methanol. The salt formed is then precipitated out of solution by the addition of a solvent which is miscible with the solvent used for carrying out the reaction but in which the salt is insoluble or only very sparingly soluble. A suitable solvent for this purpose is diethyl ether. The salt formation is conveniently carried out at room temperature.

When the salts obtained are to be subjected to a Mannich reaction, they are dissolved in a suitable solvent, such as methanol, to which is added the amine and formaldehyde. The Mannich reaction is preferably carried out at a temperature of 15–25° C. The amino methylated compounds formed can be isolated, for example, by concentration of the reaction mixture and/or by the addition of another solvent in which the products are insoluble but which is miscible with the solvent used for carrying out the reaction. Suitable solvents for this purpose are diethyl ether and ethyl acetate.

The new salts according to the present invention can be admixed with any appropriate solid or liquid pharmaceutical carriers for administration orally, rectally or by injection. Thus the new salts can be formulated as capsules, sugar-coated or film-coated tablets, syrup, granulates, dispersion, suppositories or injectable solutions. Furthermore, the new salts can be lyophilised and diluted with a suitable diluent, such as double distilled water or physiological saline, prior to administration. The solutions for injection can also contain a compatible polymer, such as polyvinyl-pyrrolidone, or a local anaesthetic. The compositions for oral administration can be mixed with, for example, sugars, flavorings, caramel and the like, in order to make the administration thereof more palatable.

The following examples are given for the purpose of illustrating the present invention:

EXAMPLE 1

Equimolecular quantities of tetracycline (free base), with a water content of less than 1% by weight, and glucose-1-phosphoric acid are dissolved in methanol. The solution is concentrated to a small volume under reduced pressure and low temperature, diethyl ether then added to complete the precipitation of the salt, which is subsequently isolated by filtration, washed with fresh diethyl ether and, after further filtration, dried in a vacuum. The mono-(tetracycline) glucose-1-phosphate obtained (molar ratio 1:1) is a yellow powder which is moderately soluble in water but practically insoluble in most common organic solvents. Its empirical formula is $C_{28}H_{37}N_2O_{17}P$ and the molecular weight of the salt obtained is 704.59. Analysis: carbon 47.75%; nitrogen 3.98%; hydrogen 5.29%; and phosphorus 4.40%.

In the same manner, there are prepared mono-(chlortetracycline) glucose-1-phosphate, mono-(oxytetracycline) glucose-1-phosphate, mono-(demethyltetracycline) glucose-1-phosphate and mono-(demethylchlortetracycline) glucose-1-phosphate.

EXAMPLE 2

The procedure of Example 1 is repeated but using two moles of tetracycline (free base) per mole of glucose-1-phosphoric acid. There is obtained di-(tetracycline) glucose-1-phosphate (molar ratio 2:1), with a molecular weight of 1149.00 and the empirical formula $$C_{50}H_{61}O_{25}PN_4$$

Analysis: carbon 52.3%; nitrogen 4.88%; hydrogen 5.35%; and phosphorus 2.69%.

Using two moles of antibiotic per mole of glucose-1-phosphoric acid, there are also prepared di-(chlortetracycline) glucose-1-phosphate, di-(oxytetracycline) glucose-1-phosphate, di-(demethyl-tetracycline) glucose-1-phosphate and di-(demethylchlortetracycline) glucose-1-phosphate.

EXAMPLE 3

Example 1 is repeated but with the use of glucose-6-phosphoric acid instead of glucose-1-phosphoric acid. The salts obtained have the same empirical formula as in Example 1 and also have similar physico-chemical characteristics.

EXAMPLE 4

Example 2 is repeated but with the use of glucose-6-phosphoric acid instead of glucose-1-phosphoric acid. The salts obtained have the same empirical formula as in Example 2 and also similar physico-chemical characteristics.

EXAMPLE 5

In a manner similar to that described in Example 1, one mole fructose-1,6-diphosphoric acid is reacted with 2 moles tetracycline (free base) to give di-(tetracycline) fructose-1,6-diphosphate, with the empirical formula $C_{50}H_{62}O_{28}N_4P_2$ and the molecular weight is 1229.02. Analysis: carbon 48.86%; nitrogen 4.56%; hydrogen 5.08%; and phosphorus 5.04%.

In the same manner, tetracycline is reacted with fructose-1,6-diphosphoric acid in the molar ratios 1:1, 3:1 and 4:1 to give the corresponding salts. Furthermore, in the same manner, 1 mole fructose-1,6-diphosphoric acid is reacted with 1, 2, 3 or 4 moles of chlortetracycline, oxytetracycline, demethyltetracycline and demethylchlortetracycline to give the corresponding salts.

EXAMPLE 6

Equimolar quantities of amphoteric tetracycline, erythromycin (free base) and glucose-1-phosphoric acid are dissolved in methanol.

The solution is concentrated at reduced pressure and low temperature, the mixed tetracycline-erythromycin salt of glucose-1-phosphoric acid is precipitated by the addition of ether, filtered off and washed with ether.

There is obtained a crystalline product which is subsequently dried in a vacuum and away from light. The dry product contains 33.4% by weight tetracycline (as the hydrochloride), 51.0% by weight erythromycin and 18.1% by weight glucose-1-phosphoric acid. It is a yellow powder which is soluble in methanol and pyridine, moderately soluble in ethanol and insoluble in water, acetone, ethyl acetate, chloroform and benzene. Its empirical formula is $C_{65}H_{104}O_{30}PN_3$ and its molecular weight is 1438.49. Analysis: carbon 54.30%; nitrogen 2.92%; hydrogen 7.29%; and phosphorus 2.15%.

In the same manner, there are prepared the mixed erythromycin-chlortetracycline salt of glucose-1-phosphoric acid, the mixed erythromycin-oxytetracycline salt of glucose-1-phosphoric acid, the mixed erythromycin-demethyltetracycline salt of glucose-1-phosphoric acid and the mixed erythromycin-demethylchlortetracycline salt of glucose-1-phosphoric acid.

EXAMPLE 7

Example 6 is repeated but using glucose-6-phosphoric acid instead of glucose-1-phosphoric acid. Similar mixed salts are obtained.

EXAMPLE 8

Example 6 is repeated but using fructose-1,6-diphosphoric acid instead of glucose-1-phosphoric acid. There is obtained the mixed erythromycin-tetracycline salt of fructose-1,6-diphosphoric acid (molar ratio 1:1:1) with the empirical formula $C_{65}H_{105}O_{33}P_2N_3$. Analysis: carbon 51.40%; nitrogen 2.77%; hydrogen 6.97%; and phosphorus 4.08%.

In the same way, from 1 to 3 moles of tetracycline and from 3 to 1 moles of erythromycin can be used per mole of fructose-1,6-diphosphoric acid or chlortetracycline, oxytetracycline, demethyltetracycline and demethylchlortetracycline can be used instead of the tetracycline free base.

EXAMPLE 9

The mixed tetracycline-erythromycin salt of glucose-1-phosphoric acid, obtained as described in Example 6, is dissolved in methanol and this solution then mixed, in equimolecular quantity, with a solution of pyrrolidine and formaldehyde in anhydrous methylene chloride. The temperature of the reaction mixture is maintained for 20-40 minutes between 15° C. and 25° C., preferably at 20° C.

The aminomethylate product obtained is isolated by concentration to a small volume, followed by precipitation with a solvent, such as diethyl ether or ethyl acetate.

*Analysis.*—Calculated (percent): carbon, 55.25; nitrogen, 3.68; phosphorus, 2.03. Found (percent): carbon, 55.14; nitrogen, 3.70; phosphorus, 2.05.

The empirical formula of the product is $C_{70}H_{113}N_4O_{30}P$ and its molecular weight is 1521.64. It is a yellow powder which is very soluble in water. A 2% aqueous solution of the salt has a pH between 5 and 6 and is stable for many hours at room temperature and for at least 48 hours at 4° C. The dry product contains 31.6% by weight tetracycline (as the hydrochloride), 48.2% by weight erythromycin and 17.1% by weight glucose-1-phosphoric acid.

The two antibiotics and the glucose-1-phosphoric acid are present in the stoichiometric ratio of 1:1:1.

In the same way, instead of the tetracycline free base, there can be used chlortetracycline, oxytetracycline, demethyltetracycline or demethylchlortetracycline to give the corresponding products.

EXAMPLE 10

Example 9 is repeated but using the corresponding mixed salts with glucose-6-phosphoric acid. Similar products are obtained.

EXAMPLE 11

Erythromycin (free base) and amphoteric tetracycline are dissolved in methanol and mixed with a concentrated methanolic solution of fructose-1,6-diphosphoric acid, the three components being used in equimolar amounts. The solution is concentrated at reduced pressure and low temperature and the mixed tetracyline-erythromycin salt of fructose-1,6-diphosphoric acid precipitated by the addition of diethyl ether. A crystalline product is obtained. It is subsequently dried in a vacuum away from light. The mixed erythromycin-tetracycline salt of fructose-1,6-diphosphoric acid, after drying in a vacuum, contains 31.65% by weight tetracycline (as the hydrochloride); 48.3% by weight erythromcyin and 22.40% by weight fructose-1,6-diphosphoric acid. This salt is a yellow powder which is soluble in methanol, ethanol and pyridine but is practically insoluble in water.

In the same way, salts can be prepared from 1 to 3 moles of tetracycline and from 3 to 1 moles of erythromycin per mole of fructose-1,6-diphosphoric acid, as well as with the use of chlortetracycline, oxytetracycline, demethyltetracycline and demethylchlortetracycline, instead of tetracycline.

EXAMPLE 12

1 mole of the salt obtained according to the first paragraph of Example 11 is dissolved in anhydrous methanol and this solution then mixed with a solution of 1 mole each of pyrrolidine and formaldehyde in methylene chloride. The temperature of the reaction mixture is maintained for about 30 minutes between 15° C. and 25° C., preferably at 20° C.

The reaction mixture is then concentrated under reduced pressure to small volume and the reaction product precipitated out by the addition of diethyl ether.

The salt obtained, i.e. the mixed erythromycinpyrrolidinomethyltetracycline salt of fructose-1,6-diphosphoric acid has the following analysis:

*Analysis.*—Calculated (percent): carbon, 52.90; nitrogen, 3.50; phosphorus, 3.87. Found (percent): carbon, 52.52; nitrogen, 3.47; phosphorus, 4.00.

Its empirical formula is $C_{70}H_{114}O_{33}P_2N_4$ and its molecular weight is 1601.66. It contains 30.2% by weight tetracycline (calculated as the hydrochloride), 45.8% by weight erythromycin and 21.25% by weight fructose-1,6-diphosphoric acid.

The salt is a yellow powder which is soluble in water; a 2% aqueous solution thereof has a pH between 5 and 6 and is stable for several hours at room temperature and for at least 48 hours at 4° C.

Erythromycin, pyrrolidinomethyl-tetracycline and fructose-1,6-diphosphoric acid are present in this salt in the ratios 1:1:1.

By the same method, there can be prepared other salts containing from 1 to 3 moles of pyrrolidinomethyltetracycline and from 3 to 1 mole of erythromycin per mole of fructose-1,6-diphosphoric acid. The following antibiotics can also be used instead of tetracycline: chlortetracycline, oxytetracycline, demethyltetracycline, demethylchlortetracycline, but always using erythromycin as the second antibiotic.

EXAMPLE 13

Equimolecular quantities of amphorteric tetracycline, erythromycin base and phosphoric acid are dissolved in methanol. This solution is concentrated under reduced pressure and low temperature and the mixed tetracycline-erythromycin phosphate product precipitated with ether, filtered off and washed with ether. The product obtained is then dried in a vacuum and away from light. The product contains the three components in the molar ratio 1:1:1 and contains tetracycline (as the hydrochloride) in an amount of 37.69% by weight and erythromycin in an amount of 57.50% by weight.

It is a yellow powder which is soluble in methanol and pyridine, moderately soluble in ethanol and insoluble in water, acetone, ethyl acetate, chloroform and benzene. Its empirical formula is $C_{59}H_{94}N_3O_{25}P$ and its molecular weight 1276.35. Analysis: carbon 55.5%; nitrogen 3.29%; hydrogen 7.42%; and phosphorus 2.43%.

By the same method, there can be prepared mixed erythromycin-tetracycline phosphates in the molar ratios 1:1:2 and 1:2:1, as well as mixed erythromycin-chlortetracycline phosphates, mixed erythromycin-oxytetracycline phosphates, mixed erythromycin-demethyltetracycline phosphates and mixed erthromycin-demethylchlortetracycline phosphates.

EXAMPLE 24

Equimolecular quantities of amphoteric tetracycline, erythromycin base and citric acid are dissolved in methanol. The solution is concentrated under reduced pressure and low temperature, the mixed tetracycline-erythromycin citrate (molar ratio 1:1:1) precipitated with ether, filtered off and washed with ether.

The product obtained is dried in a vacuum and away from light. The dry product contains 35.07% by weight tetracycline (as the hydrochloride) and 53.5% by weight erythromycin. It is a yellow powder which is soluble in methanol and pyridine, moderately soluble in ethanol and insoluble in water, acetone, ethyl acetate, chloroform and benzene. Its empirical formula is $C_{65}H_{99}N_3O_{28}$ and its molecular weight 1370.47. Analysis: carbon 57.0%; hydrogen 7.28% and nitrogen 3.06%.

By the same method, there can be prepared mixed tetracycline-erythromycin citrates in the molar ratios 2:1:1 and 1:2:1, as well as mixed erythromycin-chlortetracycline citrates, mixed erythromycin-oxytetracycline citrates, mixed erythromycin-demethyl-tetracycline citrates and mixed erythromycin-demethylchlortetracycline citrates.

EXAMPLE 15

Equimolecular quantities of amphoteric tetracycline, erythromycin base and sulphuric acid are dissolved in methanol. The solution is concentrated under reduced pressure and low temperature and the mixed tetracycline-erythromycin sulphate (molar ratio 1:1:1) precipitated with ether, filtered off and washed with ether. The product obtained is dried in a vacuum and away from light. The dry product contains 37.69% by weight tetracycline (as the hydrochloride) and 57.50% by weight erythromycin. It is a yellow powder which is soluble in methanol and pyridine, moderately soluble in ethanol and insoluble in water, acetone, ethyl acetate, chloroform and benzene. Its empirical formula is $C_{59}H_{93}N_3O_{25}S$ and its molecular weight 1276.43. Analysis: carbon 55.5%; hydrogen 7.34%; nitrogen 3.29%; and sulphur 2.5%.

EXAMPLE 16

The mixed tetracycline-erythromycin phosphate prepared in Example 13 is dissolved in methanol and this solution mixed, in equimolecular quantities, with a solution of pyrrolidine and formaldehyde in anhydrous methylene chloride. The temperature is maintained for 20–40 minutes between 15° C. and 25° C., preferably at 20° C.

The aminomethylated product obtained is isolated by concentration of the solution to a small volume, followed by precipitation with a solvent, such as diethyl ether or ethyl acetate. The product has the empirical formula $C_{64}H_{103}O_{25}N_4P$ and its molecular weight is 1359.47. Analysis: carbon 56.55%; hydrogen 7.64%; nitrogen 4.12%; and phosphorus 2.28%.

It is a yellow powder which is very soluble in water. A 2% aqueous solution thereof has a pH between 5 and 6 and it is stable for many hours at room temperature and for at least 48 hours at 4° C.

The dry product contains 35.38% by weight tetracycline (as the hydrochloride) and 53.95% by weight erythromycin. The two antibiotics and the phosphoric acid are present in the stoichiometric ratio 1:1:1.

By the same method, there can be prepared mixed pyrrolidinomethyltetracycline-erythromycin phosphates in the molar ratios 1:2:1 and 2:1:1. In the same way, instead of the tetracycline base, there can be used chlortetracycline, oxytetracycline, demethyltetracycline and demethylchlortetracycline.

EXAMPLE 17

The mixed tetracycline-erythromycin citrate prepared in Example 14 is dissolved in methanol and this solution mixed in equimolar quantities with a solution of pyrrolidine and formaldehyde in anhydrous methylene chloride. The temperature is maintained for 20–40 minutes between 15° C. and 25° C., preferably at 20° C. The aminomethylated product obtained is isolated by concentration of the solution to a small volume, followed by precipitation with a solvent, such as diethyl ether or ethyl acetate. The product has the empirical formula $C_{70}H_{108}O_{28}N_4$ and its molecular weight is 1453.59. Analysis: carbon 57.85%; hydrogen 7.49%; and nitrogen 3.85%.

It is a yellow powder which is very soluble in water. A 2% aqueous solution thereof has a pH between 5 and 6 and is stable for many hours at room temperature and for at least 48 hours at 4° C. The dry product contains 33.08% by weight tetracycline (as the hydrochloride) and 50.45% by weight erythromycin. The two antibiotics and the citric acid are present in the stoichiometric ratio 1:1:1.

By the same method, there can be prepared pyrrolidinomethyltetracyline-erythromycin citrates in the molar ratios 1:2:1 and 2:1:1. In the same way, instead of the tetracycline base, there can be used chlortetracycline, oxytetracycline, demethyltetracycline and demethylchlortetracycline.

EXAMPLE 18

The mixed tetracycline-erythromycin sulphate prepared in Example 15 is dissolved in methanol, and this solution mixed with equimolecular quantities with a solution of pyrrolidine and formaldehyde in anhydrous methylene chloride. The temperature is maintained for 20–40 minutes between 15° C. and 25° C., preferably at 20° C. The aminomethylated product obtained is isolated by concentration of the solution to a small volume, followed by precipitation with a solvent, such as diethyl ether or ethyl acetate. The product has the empirical formula $C_{64}H_{102}O_{25}N_4S$ and its molecular weight is 1359.55. Analysis: carbon 56.55%; hydrogen 7.57%; and nitrogen 4.12%.

It is a yellow powder which is very soluble in water. A 2% aqueous solution thereof has a pH between 5 and 6 and is stable for many hours at room temperature and for at least 48 hours at 4° C. The dry product contains 35.38% by weight tetracycline (as the hydrochloride) and 53.95% by weight erythromycin.

In the same way, instead of the tetracycline base, there can be used chlortetracycline, oxytetracycline, demethyltetracycline and demethylchlortetracycline.

As indicated above, the present invention also includes within its scope pharmaceutical compositions containing one or more of the new salts. These pharmaceutical compositions can be administered orally or parenterally in admixture with a solid or liquid pharmaceutical carrier.

Solid compositions for oral administraton include compressed tablets, pills, dispersible powders and granules. In such solid compositions, at least one of the new salts is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavoring agents.

The compositions according to the present invention, for oral administration, include capsules of absorbable material, such as gelatine, containing at least one of the new salts, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilized, for example, by filtration through bacteria-retaining filters, by incorporation into the compositions of sterilizing agents, by irradiation or by heating. They may also be produced in the form of sterile solid compositions, which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained. In general, the preparations of the present invention should be administered, in the case of oral administration, to give 20 to 1000 mg. of active substance per day and, in the case of parenteral administration, 10 to 500 mg. of active substance per day.

The following examples illustrate pharmaceutical compositions according to the present invention:

EXAMPLE 19

50 mg. tablets are prepared containing:

| | Mg. |
|---|---|
| Erythromycin-tetracycline phosphate | 250 |
| Starch | 150 |
| Lactose | 95 |
| Magnesium stearate | 5 |

EXAMPLE 20

500 mg. tablets are prepared containing:

| | Mg. |
|---|---|
| Erythromycin-tetracycline glucose-1-phosphate | 250 |
| Starch | 150 |
| Lactose | 95 |
| Magnesium stearate | 5 |

The novel products according to the present invention have the same utilities as the respective included antibiotics per se.

We claim:

1. A salt which is a reaction product of equimolar amounts of glucose-1-phosphate with an antibiotic selected from the group consisting of tetracycline, oxytetracycline, chlortetracycline, demethyltetracycline and demethylchlortetracycline.

2. A salt which is a reaction product of glucose-1-phosphate with two mol equivalents of an antibiotic selected from the group consisting of tetracycline, chlortetracycline, oxytetracycline, demethyltetracycline and demethylchlortetracycline.

3. A salt which is a reaction product of equimolar amounts of glucose-6-phosphate with an antibiotic selected from the group consisting of tetracycline, chlortetracycline, oxytetracycline, demethyltetracycline and demethylchlortetracycline.

4. A salt which is a reaction product of glucose-6-phosphate with two mol equivalents of an antibiotic selected from the group consisting of tetracycline, chlortetracycline, oxytetracycline, demethyltetracycline and demethylchlortetracycline.

5. A salt which is a reaction product of fructose-1,6-diphosphate with one, two, three or four mol equivalents of an antibiotic selected from the group consisting of tetracycline, chlortetracycline, oxytetracycline, demethyltetracycline and demethylchlortetracycline.

6. A salt which is a reaction product of equimolar amounts of glucose-1-phosphate, erythromycin and an antibiotic selected from the group consisting of tetracycline, chlortetracycline, oxytetracycline, demethyltetracycline and demethylchlortetracycline.

7. A salt which is a reaction product of equimolar amounts of glucose-6-phosphate, erythromycin and an antibiotic selected from the group consisting of tetracycline, chlortetracycline, oxytetracycline, demethyltetracycline and demethylchlortetracycline.

8. A salt which is a reaction product of fructose-1,6-diphosphate with 1, 2 or 3 mol equivalents of erythromycin and 3, 2 or 1 mol equivalents of an antibiotic selected from the group consisting of tetracycline, chlortetracycline, oxytetracycline, demethyltetracycline and demethylchlortetracycline.

9. A salt which is a reaction product of phosphoric acid with an equimolar amount of erythromycin and with one or two mol equivalents of an antibiotic selected from the group consisting of tetracycline, chlortetracycline, oxytetracycline, demethyltetracycline and demethylchlortetracycline.

10. A salt which is a reaction product of citric acid with one or two mol equivalents of erythromycin and two or one mol equivalents of an antibiotic selected from the group consisting of tetracycline, chlortetracycline, oxytetracycline, demethyltetracycline and demethylchlortetracycline.

11. A salt which is a reaction product of sulphuric acid with an equimolar amount of erythromycin and an equimolar amount of an antibiotic selected from the group consisting of tetracycline, chlortetracycline, oxytetracycline, demethyltetracycline and demethylchlortetracycline.

12. A salt which is a reaction product of equimolar amounts of a salt made by reacting equimolar amounts of glucose-1-phosphate or glucose-6-phosphate and an antibiotic selected from the group consisting of tetracycline, chlortetracycline, oxytetracycline, demethyltetracycline and demethylchlortetracycline with pyrrolidine and formaldehyde.

13. A salt which is a reaction product of equimolar amounts of a salt made by reacting fructose-1,6-diphosphate with 1, 2 or 3 mol equivalents of erythromycin and 3, 2 or 1 mol equivalents of an antibiotic selected from the group consisting of tetracycline, chlortetracycline, oxytetracycline, demethyltetracycline and demethylchlortetracycline with pyrrolidine and fomaldehyde.

14. A salt which is a reaction product of equimolar amounts of a salt made by reacting equimolar amounts of sulphuric or phosphoric acid, erythromycin and an antibiotic selected from the group consisting of tetracycline, chlortetracycline, oxytetracycline, demethyltetracycline and demethylchlortetracycline with pyrrolidine and formaldehyde.

15. A salt which is a reaction product of equimolar amounts of a salt made by reacting citric acid with one or two mol equivalents of erythromycin and two or one mol equivalents of an antibiotic selected from the group consisting of tetracycline, chlortetracycline, oxytetracycline, demethyltetracycline and demethylchlortetracycline with pyrrolidine and fomaldehyde.

References Cited
UNITED STATES PATENTS

| | | |
|---|---|---|
| 2,743,268 | 4/1956 | Stieff. |
| 2,925,342 | 2/1960 | Sherman et al. |
| 3,359,162 | 12/1967 | Ghielmetti _____ 260—234 |

ELBERT L. ROBERTS, Primary Examiner

J. R. BROWN, Asssitant Examiner

U.S. Cl. X.R.

260—234; 424—181, 227